United States Patent
Moccagatta et al.

(10) Patent No.: US 8,437,405 B1
(45) Date of Patent: May 7, 2013

(54) SYSTEM AND METHOD FOR INTRA REFRESH IMPLEMENTATION

(75) Inventors: Iole Moccagatta, San Jose, CA (US);
Atul Garg, Sunnyvale, CA (US);
Shankar Moni, Bangalore (IN);
Dipankar Talukdar, San Jose, CA (US);
Ignatius B. Tjandrasuwita, Atherton, CA (US); Sandeep Shyamsukha, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 1238 days.

(21) Appl. No.: 11/008,324

(22) Filed: Dec. 8, 2004

(51) Int. Cl.
*H04N 7/12* (2006.01)
*H04N 11/02* (2006.01)

(52) U.S. Cl.
USPC ............................. 375/240.24; 375/240.13

(58) Field of Classification Search ............. 375/240.13, 375/240.24
See application file for complete search history.

(56) References Cited

U.S. PATENT DOCUMENTS

| | | | |
|---|---|---|---|
| 6,025,888 A * | 2/2000 | Pauls | 375/240.27 |
| 2002/0159525 A1 | 10/2002 | Jeong | |
| 2003/0158608 A1 * | 8/2003 | Ishikawa et al. | 700/2 |
| 2003/0235249 A1 * | 12/2003 | Zhao et al. | 375/240.13 |
| 2004/0114576 A1 * | 6/2004 | Itoh et al. | 370/352 |
| 2004/0184548 A1 * | 9/2004 | Kerbiriou et al. | 375/240.28 |

* cited by examiner

*Primary Examiner* — Richard Torrente

(57) ABSTRACT

The present invention includes a method and system for encoding video data by accessing a picture to be encoded, wherein the picture comprises a plurality of macro-blocks. A plurality of programmable counters are associated with each macro-block to be encoded. A counter associated with a macro-block of the plurality of macro-blocks is accessed and a value of the counter is determined. The method further includes determining whether to encode the macro-block as an Intra or non-Intra based on the value of the counter. If the macro-block is encoded as Intra, its counter is reset. If the macro-block is encoded as non-Intra, its counter value is updated. The counter value may be reset with a random number. Counters can be programmed such that a region of interest is defined for updating associated macro-blocks with greater frequency.

25 Claims, 10 Drawing Sheets

200

| Macro-block 210 | Macro-block 211 | Macro-block 212 |
|---|---|---|
| Macro-block 220 | Macro-block 221 | Macro-block 222 |
| Macro-block 230 | Macro-block 231 | Macro-block 232 |

| Counter 310 | Counter 311 | Counter 312 |
|---|---|---|
| Counter 320 | Counter 321 | Counter 322 |
| Counter 330 | Counter 331 | Counter 332 |

| 1..70 | 1..70 | 1..70 | 1..70 | 1..70 |
| 1..70 | 1..70 | 1..70 | 1..70 | 1..70 |
| 1..70 | 1..70 | 1..70 | 1..70 | 1..70 |
| 1..5 | 1..5 | 1..5 | 1..5 | 1..5 |

SYSTEM AND METHOD FOR INTRA REFRESH IMPLEMENTATION

FIELD OF THE INVENTION

The present invention is related to video encoding of digital signals. More particularly, embodiments of the present invention are directed towards video encoding techniques for better bandwidth utilization between a transmitter and a receiver device.

BACKGROUND ART

The MPEG (Motion Picture Experts Group) 1/2/4 and H.261/263 video coding standards require each macro-block to be coded as Intra after it has been coded as non-Intra for 132 times consecutively. This requirement reduces the propagation of visual artifacts generated by the IDCT (Inverse Discrete Cosine Transform) mismatch between the encoder and the decoder.

Low transmission delay is a very important requirement for two-way visual communication over a very low bandwidth channel. To limit the transmission delay and to reduce the bandwidth required for transmission, very few Intra frames are used. The lack of Intra frames generally results in very poor visual quality.

Sending an Intra frame every 132 times results in a bandwidth spike over the transmission line because the Intra frames are significantly larger than non-Intra frames. These bandwidth spikes can cause unwanted delays in the rendering of the signal. This is particularly unwanted for real-time applications, such as video conferencing, etc.

A frame is composed of many individual macro-blocks of data. Macro-block Intra refresh techniques are used to reduce the propagation of visual artifacts resulting from transmission over error prone channels. Macro-block Intra refresh is also used to address the problem of trans-coding compressed video bit streams, e.g., spatial-temporal resolution. However, these macro-block Intra refresh techniques propose very specific ways in which to select which macro block is Intra refreshed.

Thus, there exists a need for improving visual quality of an encoded signal while reducing bandwidth spikes over low bandwidth channels. There exists a need for such a solution that also utilizes macro-block Intra refresh techniques in an improved manner.

SUMMARY OF THE INVENTION

Accordingly, a system and method for a generic, low complexity and adaptive Intra refresh would be an improvement over the art. A system and method for Intra refresh implementation is presented. Embodiments of the present invention include a method for encoding video data comprising accessing a picture frame to be encoded, wherein the picture frame comprises a plurality of macro-blocks. A plurality of counters are respectively assigned to each macro-block. The method further includes accessing a counter associated with a macro-block of the plurality of macro-blocks and determining a value of the counter. The method further includes determining whether to encode the macro-block as an Inter or Intra macro-block based on the value of the counter. The determination of whether to Intra refresh for a particular macro-block may be randomly made and/or based on a pattern refresh. A system for encoding video data is also presented.

It is appreciated that any of a number of well known decoding systems can be used with the encoding system of the present invention.

More specifically, embodiments address the implementation of macro-block Intra refresh for a video encoder. An embodiment consists of a low complexity macro-block Intra refresh implementation that controls the coding type of each macro-block in the picture frame by maintaining a per macro-block counter. The counters may be implemented in a memory that can be accessed (e.g., read and modified) by both the encoder and by the entity that controls the encoder (e.g., software driver, etc.). This entity may be referred to as the driver.

The value of the counter is used to control the coding type of the macro-block, thus overwriting any of the encoder's own macro-block decision mode. Therefore, by controlling the value of the counter, the driver can control the coding type of each macro-block.

The counter can be initialized by both the encoder or by the driver. In one embodiment, its value may be decremented (or alternatively incremented) by the encoder each time the corresponding macro-block is encoded. The decrementing procedure is described in the following. In one example, once the counter reaches a threshold value, e.g., zero, the encoder forces the macro-block to be coded as Intra. At the same time, the driver can re-initialize the counter with a value of its choice.

Different procedures may be used to decrement the macro-block counter according to various embodiments. In one embodiment, the counter is decremented each time the macro-block is coded, regardless of the coding mode chosen by the encoder's own macro-block decision mode. In a second embodiment, the counter is decremented each time the macro-block is coded as non-Intra. If the encoder's own macro-block decision mode decides to code a macro-block as Intra, then its counter is re-initialized regardless of its current value.

In one embodiment, the driver may control the value used to initialize and re-initialize the counter on a macro-block per macro-block basis. To simplify the memory access as well as to minimize the interaction between the encoder and the driver, two modes to initialize and re-initialize the macro-block counters may be used. In a random mode, the interaction between the encoder and the driver is reduced. The driver chooses a range, which may be specified by minimum and maximum values. The encoder then generates a pseudo random value that falls in the range specified by the driver, and uses this pseudo-random value to initialize the macro-block counter. A different pseudo random value is generated for each counter. The process may be repeated each time the counter needs to be re-initialized. The range can be on a macro-block-by-macro-block basis, or different ranges can be associated with different Regions of Interest (ROI).

In a pattern mode, the driver may specify the value of the initialization counter for each of the macro-block in the picture. This way the driver can create a pattern in the way the macro-block are Intra refreshed. A fixed value, also selected by the driver, is used to re-initialize the macro-block counter when needed. To maintain the pattern, the re-initialization value is the same for all the macro-block in the picture. In addition, the driver can change the entire pattern during the encoding process. Pattern and random modes may be mixed.

In addition, all of the above mentioned parameters that are driver controlled can have different values depending on the picture type (e.g., one set of values for Intra picture, one set of values for non Intra picture, etc.). Moreover, all the above-mentioned parameters may be modified dynamically by the driver during the encoding process,

BRIEF DESCRIPTION OF THE FIGURES

The accompanying drawings, which are incorporated in and form a part of this specification, illustrate embodiments of the present invention and, together with the description, serve to explain the principles of the invention:

FIG. 2 is a block diagram of an exemplary picture frame divided into a plurality of macro-blocks in accordance with embodiments of the present invention.

FIG. 3A is a block diagram of an exemplary memory array for storing counters (e.g., counter registers) associated with macro-blocks of a picture in accordance with embodiments of the present invention.

FIG. 3B is an exemplary memory array illustrating respective ranges for each macro-block of a picture in accordance with one embodiment of the present invention.

DETAILED DESCRIPTION OF THE INVENTION

Figure 1:
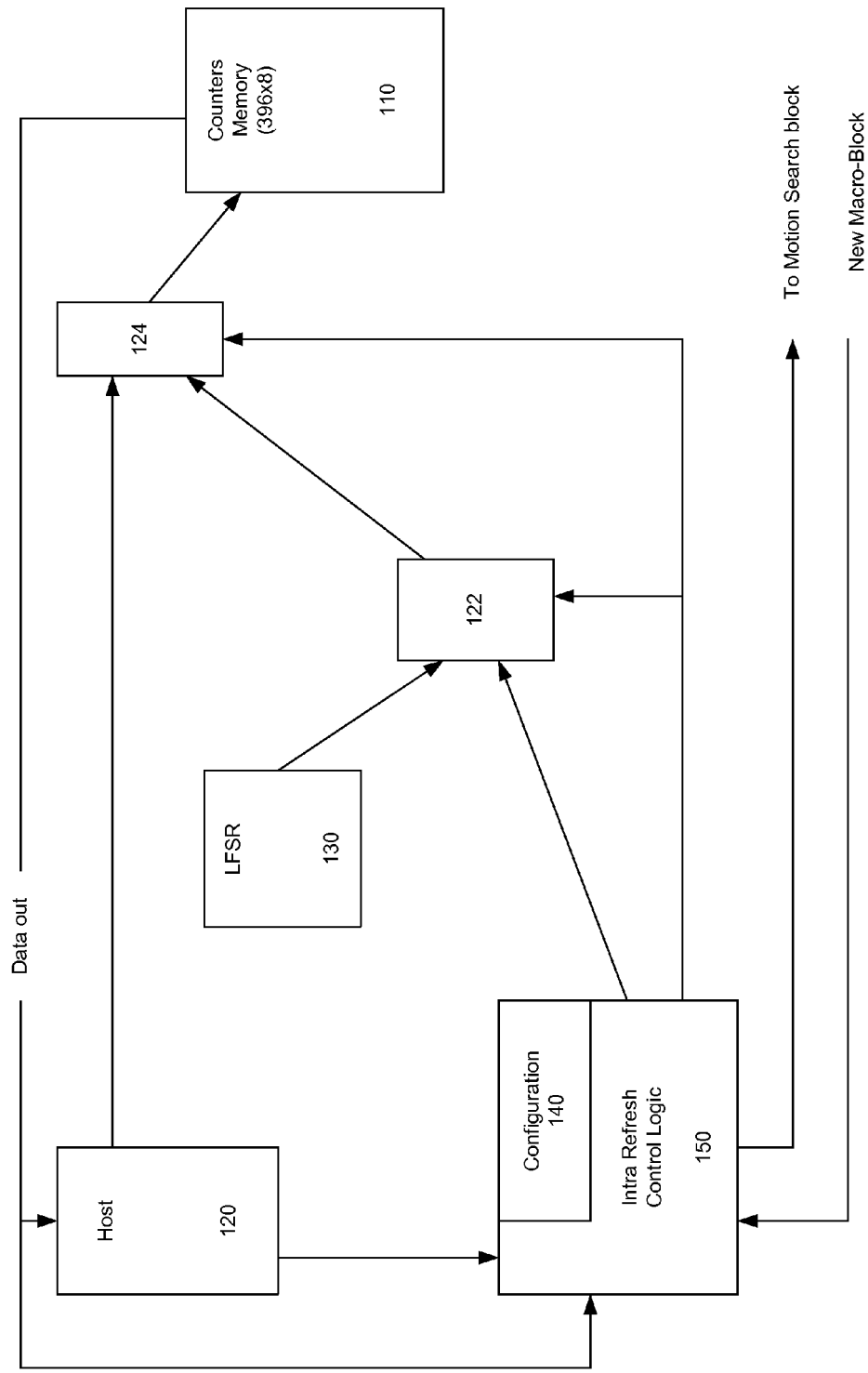
FIG. 1 is a block diagram and data flow diagram of an exemplary system for encoding video data in accordance with embodiments of the present invention.

Reference will now be made in detail to the various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "performing," "storing," "using," "producing," "receiving," "generating," "determining," "decrementing," "accessing," "processing," "generating," "encoding," "resetting," "overriding" or the like, refer to actions and processes (e.g., flowcharts 400, 500, 600, 700 and 800 of FIGS. 4, 5, 6, 7, and 8, respectively) that may partially or totally be performed on a computer system or similar electronic computing device or processor. The computer system or similar electronic computing device manipulates and transforms data represented as physical (electronic) quantities within the computer system memories, registers or other such information storage, transmission or display devices.

A number of technical terms used in the detailed description of the present invention are typical of the MPEG (Moving Picture Expert Group) video standards, such as MPEG-1, MPEG-2, and MPEG-4. Examples of such terms are macro-block, Intra macro-block encoding mode, etc. Although embodiments of the present invention are well suited to be used for MPEG video encoders, it is appreciated that these embodiments are not limited for use with MPEG encoders but could be used in a variety of encoding standards and techniques. For example, the term "macro-blocks," which in MPEG defines as non-overlapping blocks of 16×16 pixels, can be replaced by a block or domain of pixels (overlapping or not, rectangular or not).

Embodiments of the present invention address the implementation of macro-block Intra refresh techniques for a video encoder. The macro-block Intra refresh implementation controls the coding of each macro-block in the picture by maintaining a per macro-block counter. The counters, or counter registers, may be implemented in a memory array that can be accessed by both the encoder and by the entity that controls the encoder (e.g., encoder driver). However, embodiments of the present invention are not limited to requiring a driver.

The value of the counter is used to control the coding type of the macro-block, thus, overwriting the decision mode of the encoder. Therefore, by controlling the value of the counter, the driver can control the coding type of each macro-block.

It is appreciated that embodiments of the present invention can be implemented on various client devices such as a personal digital assistant (PDA), video gaming console, portable gaming console, cellular phone, or any other electronic device with video compatibility. It is also appreciated that embodiments of the present invention can be implemented in hardware and/or software.

In one embodiment of the invention, both the encoder and the driver can initialize the counter. Then, its value is updated (e.g., decremented, or, alternatively, incremented) by the encoder each time the corresponding Macro-block is encoded. For purposes of illustration only, decrementing is discussed as the update type. Once the counter reaches the value of zero, for instance, the encoder forces the macro-block to be coded as Intra. At the same time, the driver can re-initialize the counter with a value of its choice.

Different techniques can be used to decrement the macro-block counter. In the first embodiment, the counter is decremented each time the macro-block is encoded, regardless of the coding mode selected by the encoder: In the second embodiment, the counter is decremented each time the macro-block is coded as non-Intra, then its counter is re-initialized regardless of its current value.

In one embodiment of the invention, the driver can control the value used to initialize and re-initialize the counter on a macro-block per macro-block basis. To simplify the memory access as well as to minimize the interaction between the encoder and the driver, embodiments of the present invention uses different modes to initialize and re-initialize the macro-block counters. The random mode reduces the interaction between the encoder and the driver. The driver selects a range, specified by a minimum and a maximum value. The encoder then generates a pseudo random value that falls in the range specified by the driver, and uses this pseudo-random value to initialize the macro-block counter. A different pseudo random value is generated for each counter. The process is repeated each time the counter needs to be re-initialized. The range can be on a macro-block-by-macro-block basis, or different ranges can be associated to different Regions of Interest (ROI).

In the pattern mode, the driver specifies the value of the initialization counter for each of the macro-blocks in the picture. In this embodiment of the invention, the driver can create a pattern in the way the macro-blocks are Intra refreshed. A fixed value, chosen by the driver, is used to re-initialize the macro-block counter when needed. To maintain the pattern, the re-initialization value is the same for all of the macro-blocks in the picture. In addition, the driver can change the entire pattern during the encoding process.

In addition, all of the above mentioned parameters that are driver controlled can have different values depending on the picture type (e.g., one set of values for Intra picture, one set of values for non-Intra pictures, etc.) In addition, the driver can dynamically modify all of the above-mentioned parameters during the encoding process.

FIG. 1 is a block diagram of an exemplary system for macro-block Intra refresh in accordance with embodiments of the present invention. An M×N-bit memory 110 is used to store an N-bit counter for each of the macro-blocks in the picture frame. As an example, in FIG. 1, the value of M is equal to 396 which is the number of macro-blocks in a CIF (common intermediate format) picture, and the value of N is equal to 8. The counters, or counter registers, can be written into at any time by one of the sources. Control logic 150 controls the select lines for multiplexers 122 and 124. The sources include the controller, which is represented by host 120, the pseudo-random number generator, which is represented by the Linear Feedback Shift Register (LFSR) 130, and the Intra refresh control logic 150. Based on the counter value and the assertion of a new macro-block signal, the control logic 150 asserts or de-asserts an Intra signal to the motion search block of the encoder. The host 120, using the configuration block 140, programs the control logic 150. Using the configuration block 140, the host 120 can select the random or the pattern mode discussed above.

Embodiments of the present invention provide fine granularity control over the coding of each macro-block, or each Region of Interest (ROI). The control can be implemented at high-speed and with no controller intervention. The controller also has the choice of exercising a very interactive control. In addition, both the Intra macro-block refresh rate and the number of macro-blocks or ROI shape forced to be Intra coded can be modified during the encoding process without penalizing the encoding rate.

FIG. 2 is a block diagram of an exemplary picture frame 200 comprising a plurality of macro-blocks in accordance with embodiments of the present invention. In one embodiment of the invention, the picture frame 200 consists of pixels and is divided into a plurality of equal sized macro-blocks. In one embodiment of the invention, the picture 200 may be a CIF (Common Intermediate Format with 288 lines and 352 pixels per line) frame and comprises 396 macro-blocks, for example. In another embodiment of the invention, the picture 200 may be a QCIF (Quarter Common Intermediate Format with 144 lines and 176 pixels per line) frame and comprises 99 macro-blocks. The above is discussed for illustration and it is appreciated that the picture can be of any format and can be split into any number of macro-blocks in accordance with embodiments of the invention.

In one embodiment of the invention, encoding a macro-block as Intra means encoding the entire contents of the macro-block as an Intra macro-block type. In another embodiment of the invention, encoding a macro-block as Inter means encoding the difference from the previous frame encoding of the macro-block. In this embodiment, it is assumed that the motion vector, used to motion compensate the current macro-block, is zero. If the motion vector is zero, then the difference is between the current macro-block and its co-located one in the previous picture. In another embodiment of the invention, if the motion vector is not zero, then the difference is between the current macro-block and an area of the previous picture different from the co-located one. The location of such area is set by the motion vector.

In one embodiment of the invention, a pattern of macro-blocks is determined to be encoded as Intra macro-blocks. Encoding a particular pattern of macro-blocks provides a better picture in the areas that are encoded as Intra. For example, if the picture is most important in the middle of the screen, then the macro-block 221 would be encoded as Intra more periodically. Alternatively, if the bottom portion of the screen is the most important, then the macro-blocks 230, 231 and 232 may be selected to be encoded as Intra more periodically. Embodiments of the present invention provide flexibility to encode any portion of the picture as Intra according to the quality characteristics desired and also allow the periodicity of the encoding to be controlled.

FIG. 3A is a block diagram of an exemplary memory array for storing a plurality of counters (counter registers) associated with the plurality of macro-blocks of FIG. 2. To keep track of which macro-blocks are to be encoded as Intra, a counter system is used. In one embodiment of the invention, a counter is initially set to a predetermined value and after each time the macro-block is encoded as non-Intra, e.g., Inter, the counter associated with the macro-block is decremented by one. When the counter reaches zero, the macro-block is encoded as Intra. According to one embodiment, a software driver on the host 120 (FIG. 1) may access and update the contents of the memory 110 at any time.

In addition to having a counter value for each macro-block, memory 110 may also contain a value range (min/max) for each macro-block. The value range may be used when determining a new value for the counter, e.g., upon reset. By using different ranges for different macro-blocks, regions of interest may be defined that are updated more frequently (smaller ranges) but nevertheless using a random update technique (a random number within the range is selected).

In another embodiment of the invention, the counter is assigned a random number. As stated above, after each time the macro-block is encoded as Inter, the counter associated with the macro-block is decremented by one. When the counter reaches zero, the macro-block is encoded as Intra. Assigning a random number to each of the counters ensures that each of the macro-blocks gets encoded as Intra in a random fashion. Encoding the macro-blocks randomly reduces the possibilities that the human eye can perceive any pattern associated with encoding a particular set of macro-blocks.

FIG. 3B illustrates exemplary ranges defined for each macro-block of a picture. The programmable range configuration 350 is stored within the memory array 110. Each range is associated with a respective counter. In one embodiment, the range constrains the computation of a pseudo random number for that counter. In such manner, certain regions of interest can be defined that will be updated with Infra macro-blocks more frequently. For instance, the bottom row 360 will be updated more frequently with Intra macro-blocks than the remainder 370 due to the smaller ranges associated with the bottom row. In this manner, an update pattern of macro-blocks can be defined that are updated differently than the remainder of the picture.

Figure 4:
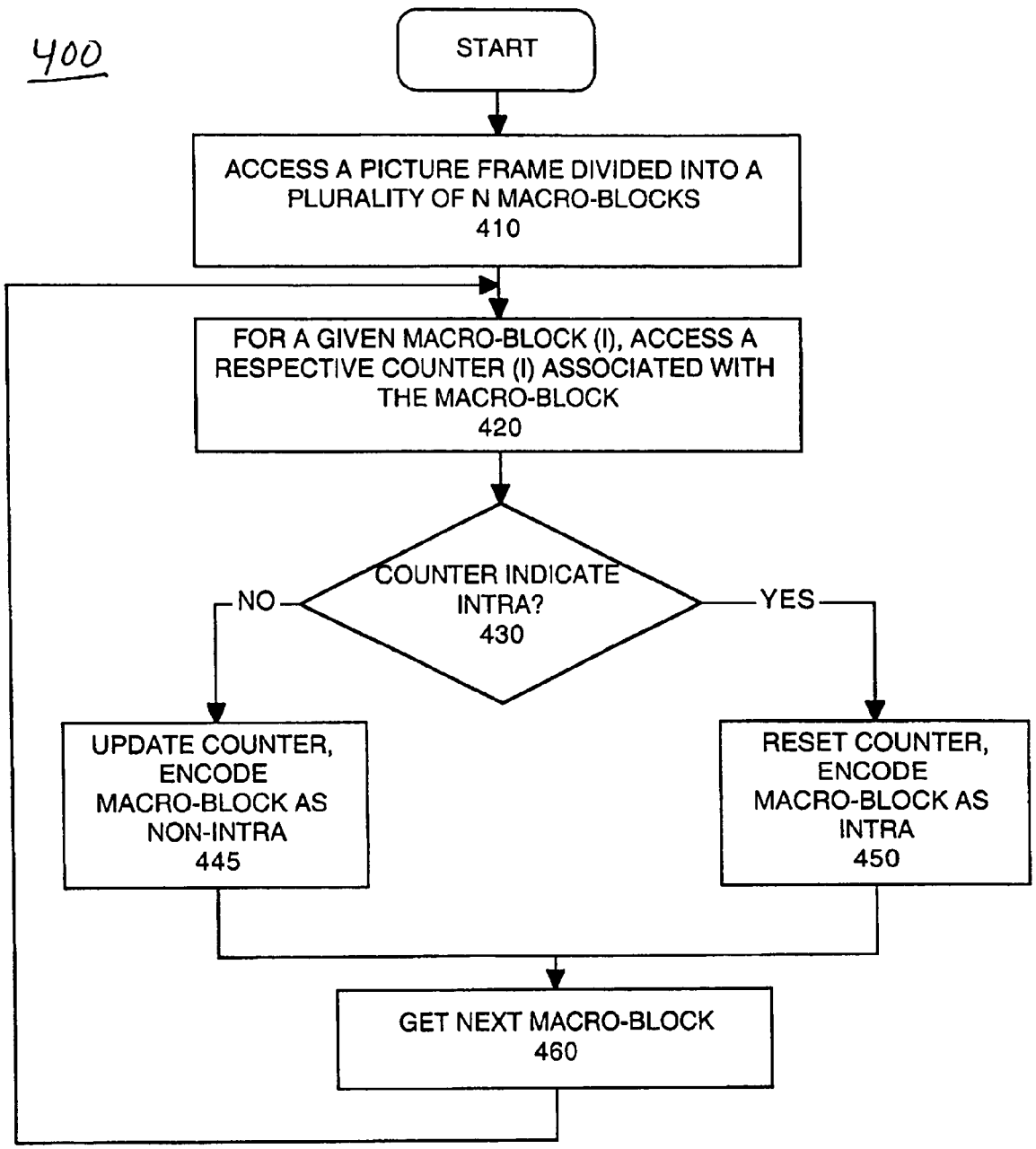
FIG. 4 is a flow diagram of an exemplary computer controlled process for encoding video data in accordance with embodiments of the present invention.

FIG. 4 is a flow diagram of an exemplary computer controlled process 400 for encoding video data in accordance with embodiments of the present invention. For clarity, embodiments of the invention illustrated in FIGS. 5, 6, 7, and 8 will be described in conjunction with the description of FIG. 4.

At step 410, embodiments of the present invention include accessing a picture frame ("picture") to be encoded, the picture includes a plurality of N macro-blocks. In one embodiment of the invention, the picture may be accessed via a wireless connection.

At step 420, a counter (counter i) associated with a macro-block (macro-block i) of the plurality of macro-blocks is accessed. In one embodiment of the invention, a memory comprising the counter is accessed. At step 430, embodiments of the present invention include determining the value of the counter accessed in step 420. In one embodiment of the invention, the value is determined to either be zero or any value different from zero. The value of the counter is used to determine whether the macro-block should be Intra or non-Intra encoded.

At steps 445 and 450, embodiments of the present invention include determining whether to encode the macro-block as Intra or non-Intra, e.g., Inter, based on the value of the counter determined in step 430. If the macro-block is determined to be Intra then the count value of its counter may be reset (step 450), otherwise, at step 445 the count value is updated and the macro-block is determined to be non-Intra. Process 400 can be repeated for each macro-block of the picture, step 460.

At step 450, the counter value may be reset to a predetermined value or the counter value may be reset to a pseudo random number that is selected between the individual range associated with the particular counter.

Figure 5:
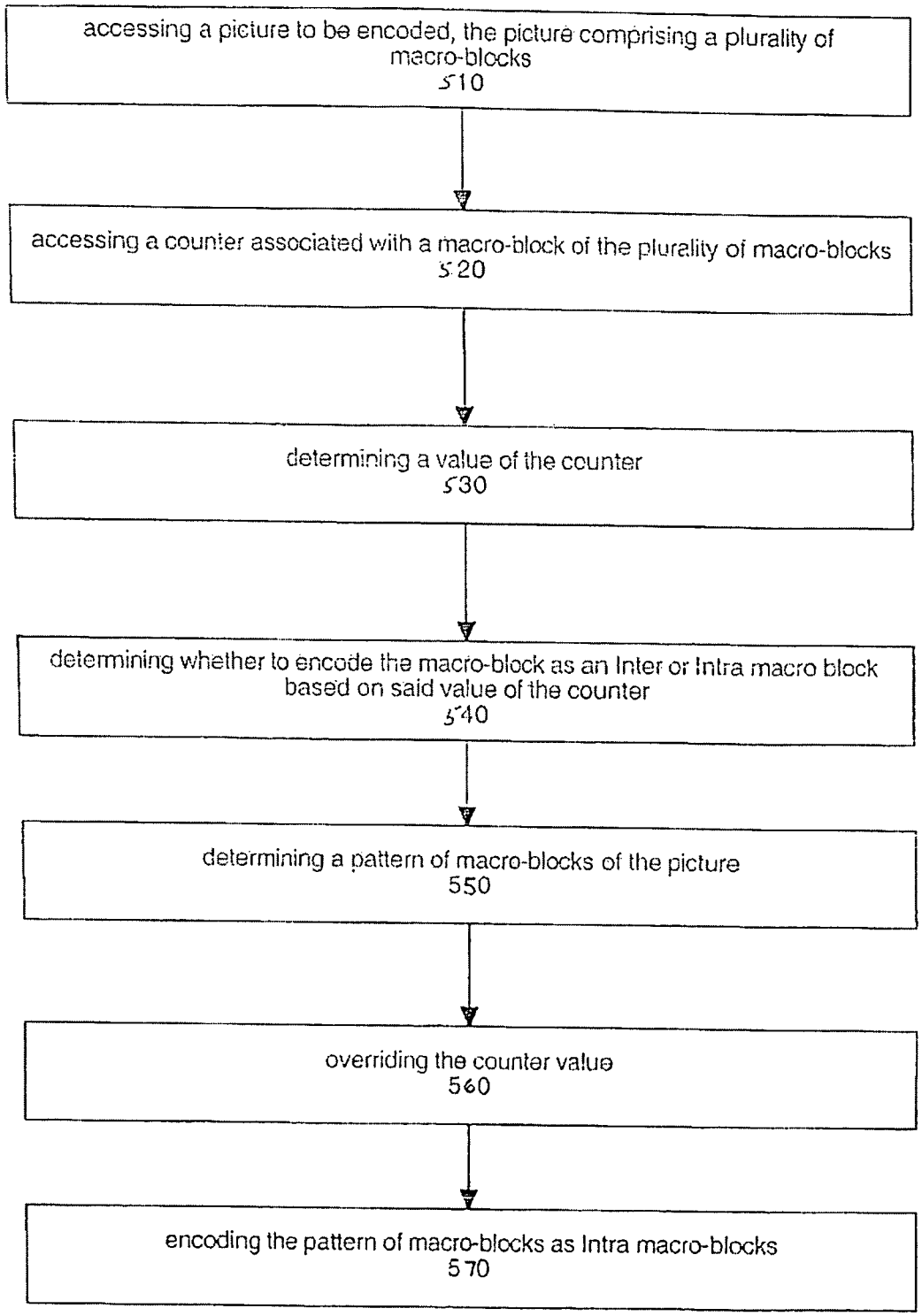
FIG. 5 is a flow diagram of an exemplary computer controlled process for encoding video data, including determining a pattern of macro-blocks to encode as Intra in accordance with embodiments of the present invention.

FIG. 5 is a flow diagram of an exemplary computer controlled process 500 for encoding video data, including determining a pattern of macro-blocks to encode as Intra in accordance with embodiments of the present invention.

Step 510 corresponds to step 410 as described in the description of FIG. 4.

Step 520 corresponds to step 420 as described in the description of FIG. 4.

Step 530 corresponds to step 430 as described in the description of FIG. 4.

At step 540, whether to encode the macro-block as an Inter or Intra macro block is determined based on the value of the counter.

At step 550, embodiments of the present invention include determining a pattern of macro-blocks of the picture. In one embodiment of the invention, the pattern is determined to be a region of interest (ROI) wherein the macro-blocks in the region of interest are encoded as Intra more often than the macro-blocks not in the ROI. For instance, stock reporting programs often define a ROI to be the lower strip of the screen where the stock prices are continually updated and scrolled from left to right.

At step 560, embodiments of the present invention include overriding the counter value. In this embodiment of the invention, if the macro-blocks is in the ROI and the counter value is not zero, embodiments of the invention nevertheless override the counter to make sure the macro-block is encoded as Intra even if the counter indicated the macro-block to be encoded as Inter. An indication of whether or not the macro-block is within the ROI may be represented by a flag associated with each macro-block and stored in the memory array 110. Alternatively, the indication of whether or not the macro-block is within the ROI may be represented by the numeric range associated with the counter of the macro-block.

At step 570, embodiments of the present invention include encoding the pattern (e.g., ROI) of macro-blocks as Intra macro-blocks. In one embodiment of the invention, the ROI is a dynamic region.

Figure 6:
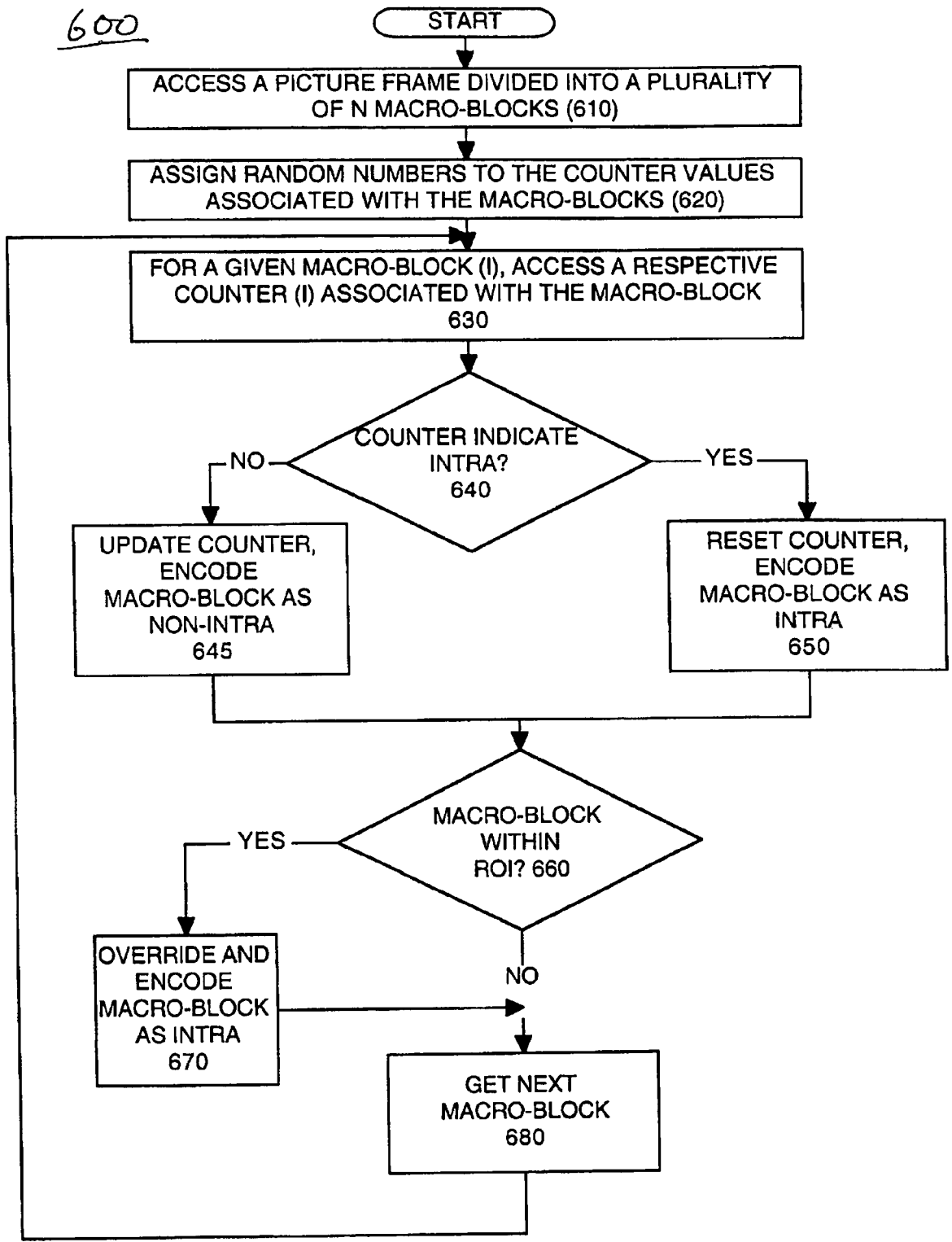
FIG. 6 is a flow diagram of an exemplary computer controlled process for encoding video data, including determining a random set of macro-blocks to encode as Intra in accordance with embodiments of the present invention.

FIG. 6 is a flow diagram of an exemplary computer controlled process 600 for encoding video data, including determining a random set of macro-blocks to encode as Intra in accordance with embodiments of the present invention.

At step 610 the picture is accessed. At step 620, embodiments of the present invention include determining a random set of macro-blocks of the picture. In one embodiment of the invention, the random set of macro-blocks is selected by assigning a random number to each of the counters associated with the macro-blocks. In one embodiment, the random number assignment is constrained to be within the individual range associated with the macro-block. By decrementing the counter each time the macro-block is encoded as Inter, the macro-blocks will accordingly be encoded as Intra randomly.

A macro-block (i) is selected and its counter value (i) is determined at 630. If the counter value indicates Intra (determined at step 640), then at 650 the counter is reset (e.g., by assignment of a random number) and the macro-block is encoded as Intra. At step 645, if the count value does not indicate Intra, then the macro-block is encoded as non-Intra and the counter value is updated, e.g., decremented.

In another embodiment of the invention, the counter value is overridden if the macro-block is determined to be part of a ROI (in the way discussed with respect to FIG. 5), step 660. At step 670, embodiments of the present invention include overriding the counter value determined in step 630.

At step 680, the process 600 is repeated for each macro-block of the picture.

Figure 7:
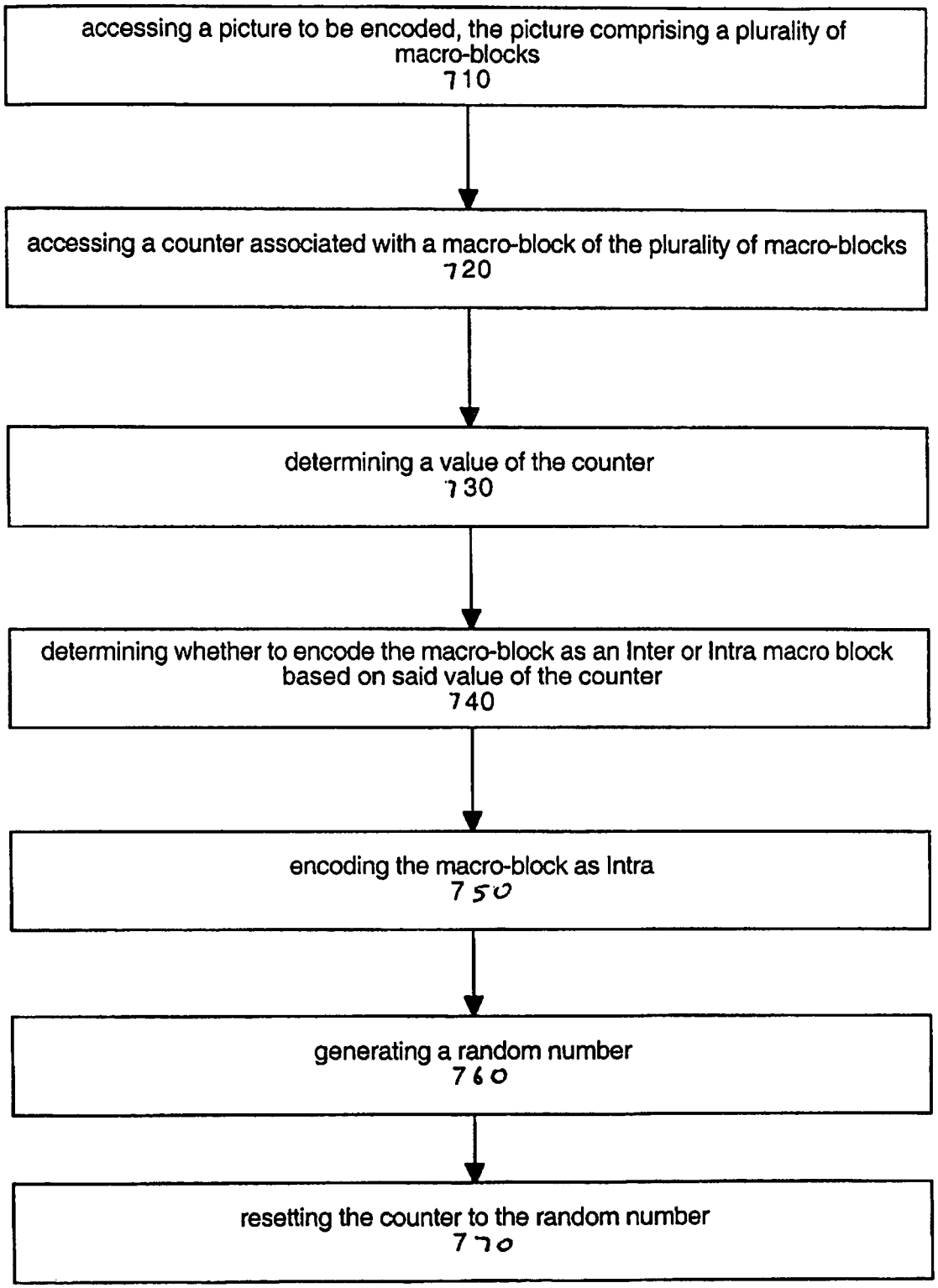
FIG. 7 is a flow diagram of an exemplary computer controlled process for encoding video data, generating a random number and resetting a counter with the random number in accordance with embodiments of the present invention.

FIG. 7 is a flow diagram of an exemplary computer controlled process 700 for encoding video data, generating a random number and resetting a counter with the random number in accordance with embodiments of the present invention.

Step 710 corresponds to step 410 as described in the description of FIG. 4.

Step 720 corresponds to step 420 as described in the description of FIG. 4.

Step 730 corresponds to step 430 as described in the description of FIG. 4.

Step 740 corresponds to step 540 as described in the description of FIG. 5.

At step 750, embodiments of the present invention include encoding the macro-block as Intra. In one embodiment of the invention, encoding the macro-block as Intra is in response to determining the value of the counter to be zero or some other predetermined value. In another embodiment of the invention, encoding the macro-block as Intra is in response to receiving a counter override indicating that the macro-block is part of a ROI.

At step 760, embodiments of the present invention include generating a random number. In one embodiment of the invention a random number is generated using a Linear Feedback Shift Register (LFSR). However, it is appreciated that a random number can be generated in any number of ways in accordance with the invention. In one embodiment, the random number is constrained to be within a range defined for the macro-block.

At step 770, embodiments of the present invention include resetting the counter to the random number generated in step 760. As stated above, assigning a random number to the counters after the macro-block is encoded as Intra, ensures that each macro-block will be encoded as Intra on a random basis.

Figure 8:
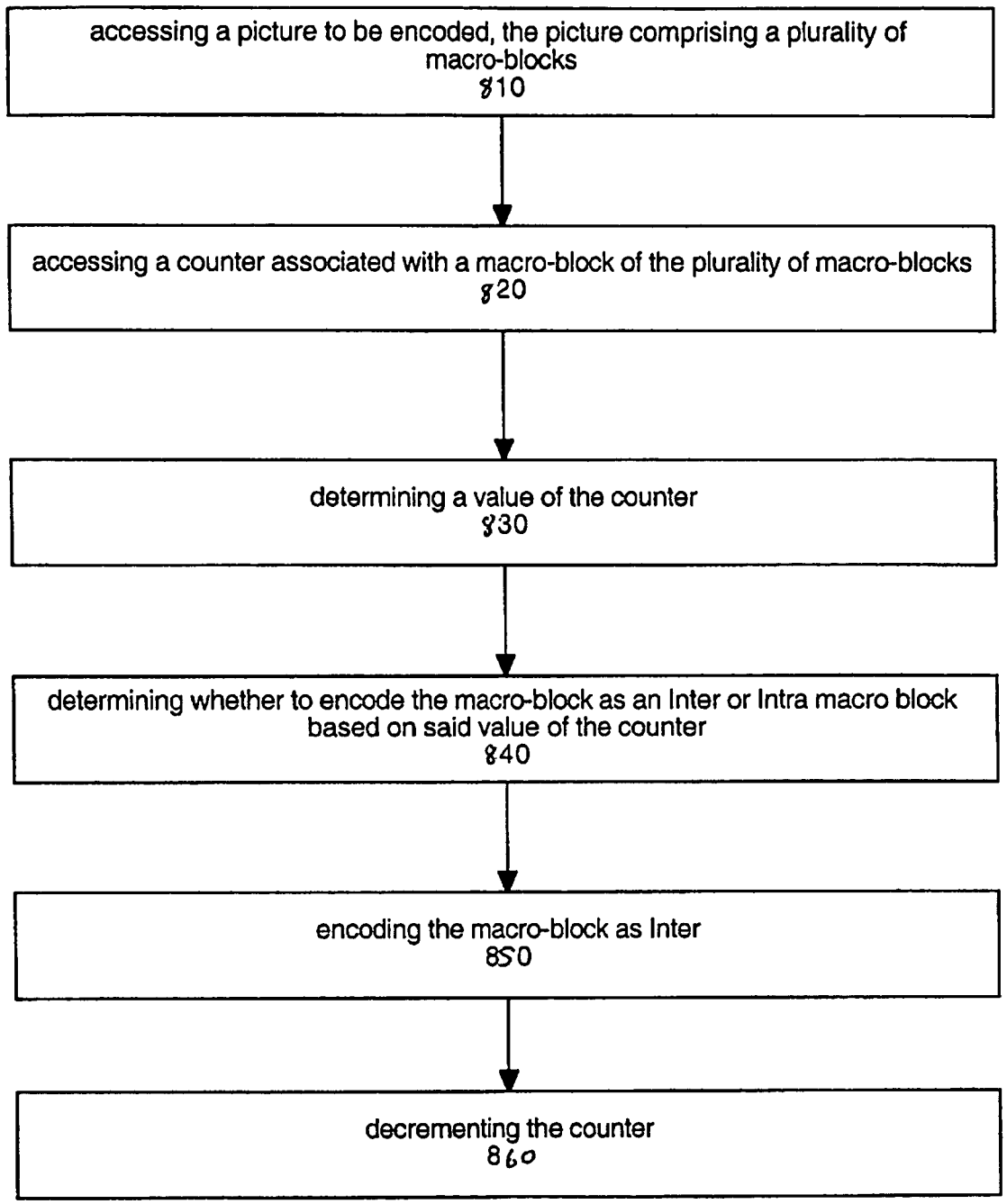
FIG. 8 is a flow diagram of an exemplary computer controlled process for encoding video data, including encoding a macro-block as Inter and in response, decrementing a counter in accordance with embodiments of the present invention.

FIG. 8 is a flow diagram of an exemplary computer controlled process 800 for encoding video data, including encoding a macro-block as Inter and in response, decrementing a counter in accordance with embodiments of the present invention.

Step 810 corresponds to step 410 as described in the description of FIG. 4.

Step 820 corresponds to step 420 as described in the description of FIG. 4.

Step 830 corresponds to step 430 as described in the description of FIG. 4.

Step 840 corresponds to step 540 as described in the description of FIG. 5.

At step 850, embodiments of the present invention include encoding the macro-block as Inter. In one embodiment of the invention, encoding the macro-block as Inter is in response to determining the counter value to be a value greater than zero in step 830.

At step 860, embodiments of the present invention include decrementing the counter. In one embodiment of the invention, the counter is decremented after each time the macro-block is encoded as Inter.

The above discussion concerns a novel signal encoding process and system. It is appreciated that a number of well-known decoders and decoding processes may be utilized to decode the signals encoded by the present invention.

Figure 9:
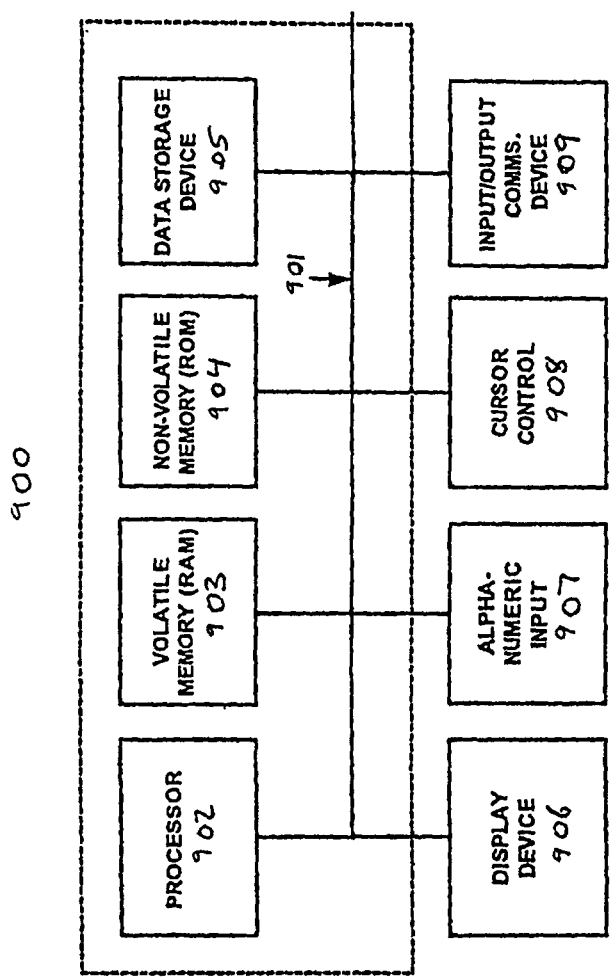
FIG. 9 is a block diagram of an exemplary computer system that can be used to control and serve as a platform for certain aspects of the embodiments of the present invention.

Referring now to FIG. 9, a block diagram of exemplary computer system 900 is shown. It is appreciated that computer system 900 of FIG. 9 described herein illustrates an exemplary configuration of an operational platform upon which embodiments of the present invention can be implemented. Nevertheless, other computer systems with differing configurations can also be used in place of computer system 900 within the scope of the present invention. For example, computer system 900 could be a server system, a node on a network, a personal computer or an embedded computer system such as a mobile telephone or pager system. Furthermore, computer system 900 could be a multiprocessor computer system.

Computer system 900 includes an address/data bus 901 for communicating information, a central processor 902 coupled with bus 901 for processing information and instructions, a volatile memory unit 903 (e.g., random access memory, static RAM, dynamic RAM, etc.) coupled with bus 901 for storing information and instructions for central processor 902 and a non-volatile memory unit 904 (e.g., read only memory, programmable ROM, flash memory, EPROM, EEPROM, etc.) coupled with bus 901 for storing static information and instructions for processor 902. Computer system 900 may also contain an optional display device 906 coupled to bus 901 for displaying information to the computer user. Moreover, computer system 900 also includes a data storage device 905 (e.g., disk drive) for storing information and instructions.

Also included in computer system 900 of FIG. 9 is an optional alphanumeric input device 907. Device 907 can communicate information and command selections to central processor 902. Computer system 900 also includes an optional cursor control or directing device 908 coupled to bus 901 for communicating user input information and command selections to central processor 902. Computer system 900 also includes signal communication interface 909, which is also coupled to bus 901, and can be a serial port. Communication interface 909 can also include number of wireless communication mechanisms such as infrared or a Bluetooth protocol.

Embodiments of the present invention, a system and method for Intra refresh implementation have been described. While the present invention has been described in particular embodiments, it should be appreciated that the present invention should not be construed as limited by such embodiments, but rather construed according to the following Claims.

What is claimed is:

1. A method for encoding video data comprising:
   accessing a picture to be encoded, said picture comprising a plurality of macro-blocks;
   accessing a memory array containing a plurality of counters, said plurality of counters being associated with said plurality of macro-blocks, wherein each counter of said plurality of counters comprises a value;
   determining whether to encode a macro-block of said plurality of macro-blocks as an Intra macro-block by comparing a value of a counter in said memory array associated with said macro-block to a predetermined value and by determining if said macro-block is located within a predetermined region of interest;
   in response to determining that said macro-block is not to be encoded as an Intra macro-block, decrementing said value of said counter associated with said macro-block and reinitializing said counter to a value not equal to said predetermined value and within a plurality of value ranges,
   in response to determining that said macro-block is an Intra macro-block, reinitializing said counter to a value within a first value range when said macro-block is located within said predetermined region of interest, and within a second value range when said macro-block is not located within said predetermined region of interest, said first value range being smaller than said second value range,
   wherein macro-blocks of said plurality of macro-blocks within said region of interest are encoded as Intra more often than macro-blocks of said plurality of macro-blocks outside said region of interest.

2. The method as recited in claim 1 wherein said determining whether to encode said macro-block as an Intra macro-block further comprises:
 determining that said macro-block is not an Intra macro-block in response to determining that said value of said counter is not equal to a predetermined value.

3. The method as recited in claim 1 wherein said determining whether to encode said macro-block as an Intra macro-block further comprises:
 determining that said macro-block is an Intra macro-block in response to determining that said value of said counter is equal to a predetermined value.

4. The method as recited in claim 1 further comprising:
 encoding said macro-block as an Intra macro-block if said macro-block is within said region of interest; and
 resetting said count value associated with said macro-block if said macro-block is within said region of interest.

5. The method as recited in claim 1 wherein said determining whether to encode said macro-block as an Intra macro-block comprises:
 determining if said macro-block is located within a random set of macro-blocks of said picture; and
 if said macro-block is located within said random set, then overriding said counter value, encoding said macro-block as an Intra macro-block and resetting said counter value.

6. The method as described in claim 1, further wherein said plurality of counters comprise counter registers contained in said memory array.

7. The method as described in claim 1, wherein the picture is implemented in Quarter Common Intermediate Format (QCIF).

8. The method as described in claim 1, wherein the picture comprises a Common Intermediate Format (CIF) frame.

9. A system for encoding video data of a picture comprising a plurality of macro-blocks, said system comprising:
 a memory array comprising a plurality of counters, each counter associated with a respective macro-block of said plurality of macro-blocks and for containing a count value indicating whether said respective macro-block is to be encoded as an Intra macro-block;
 a counter value determiner configured to enable a software driver to read said memory array to determine a value of a respective counter associated with a respective macro-block;
 an encoding determiner configured to enable said software driver to determine whether to encode said respective macro-block as an Intra macro-block by comparing said respective count value to a predetermined value and determining if said respective macro-block is located within a predetermined macro-block pattern; and
 update logic configured to enable said software driver to update counter values of said plurality of counters, said update logic coupled to said encoding determiner, and to decrement said respective count value in response to a determination not to encode said respective macro-block as an Intra macro-block,
 wherein when said encoding determiner determines that said respective macro-block is an Intra macro-block, said update logic resets said respective counter value to a value within a range of values, said range of values being a smaller range of values if said respective macro-block is located within said predetermined macro-block pattern and a larger range of values if said respective macro-block is not located within said predetermined macro-block pattern.

10. The system as recited in claim 9 wherein said encoding determiner determines that said respective macro-block is not an Intra macro-block in response to said respective counter value not being equal to a predetermined value.

11. The system as described in claim 10 wherein said update logic updates said respective counter value associated with said respective macro-block in response to said respective counter value not being equal to said predetermined value.

12. The system as recited in claim 9 wherein said encoding determiner determines that said respective macro-block is an Intra macro-block in response to said respective macro-block being located within said predetermined macro-block pattern.

13. The system as recited in claim 9 wherein said encoding determiner determines that said respective macro-block is an Intra macro-block in response to said respective counter value indicating that said respective macro-block is located within a pseudo random set of macro-blocks.

14. The system as described in claim 9, further wherein said plurality of counters comprise counter registers contained in said memory array.

15. The system as described in claim 9, wherein the picture is implemented in Quarter Common Intermediate Format (QCIF).

16. The system as described in claim 9, wherein the picture comprises a Common Intermediate Format (CIF) frame.

17. A method of encoding a picture divided into a plurality of macro-blocks, said method comprising:
 storing a plurality of counter values in a memory array, said plurality of counter values associated with said plurality of macro-blocks;
 accessing said memory array to determine a first counter value associated with a first macro-block;
 determining if said first macro-block is to be encoded as an Intra macro-block by comparing said first counter value to a predetermined value;
 determining if said first macro-block is located within a pattern of macro-blocks;
 when said first macro-block is not determined to be encoded as an Intra macro-block, updating said first counter value by decrementing said first counter value;
 when said first macro-block is determined to be encoded as an Intra macro-block, encoding said first macro-block as an Intra macro-block, and resetting said first counter value to a new value within a first value range if said first macro block is within said pattern of macro-blocks and within a second value range if said first macro-block is not within said pattern of macro-blocks,
 further wherein, said first value range is smaller than said second value range.

18. The method as described in claim 17 further comprising:
 accessing said memory array to determine a second counter value associated with a second macro-block; and
 based on said second counter value, determining if said second macro-block is to be encoded as an Intra macro-block.

19. The method as described in claim 17 wherein said determining if said first macro-block is to be encoded as an Intra macro-block comprises determining that said first macro-block is to be encoded as an Intra macro-block if said first counter value is equal to a predetermined value.

20. The method as described in claim 19 wherein said predetermined value is zero.

21. The method as described in claim 19 further comprising resetting said first counter value in response to said first counter value being equal to said predetermined value.

22. The method as described in claim 17 further comprising storing a plurality of count values within said memory wherein said plurality of count values define said pattern of macro-blocks.

23. The method as described in claim 17, further wherein said plurality of counters comprise counter registers contained in said memory array.

24. The method as described in claim 17, wherein the picture is implemented in Quarter Common Intermediate Format (QCIF).

25. The method as described in claim 17, wherein the picture comprises a Common Intermediate Format (CIF) frame.

* * * * *